United States Patent [19]
Allport et al.

[11] Patent Number: 5,862,897
[45] Date of Patent: Jan. 26, 1999

[54] TORSIONAL VIBRATION DAMPER

[75] Inventors: John Martin Allport, Barkisland; David William Henry Tennant, Slaithwaite, both of United Kingdom

[73] Assignee: Simpson International (UK) Ltd., Plymouth, Mich.

[21] Appl. No.: 662,413

[22] Filed: Jun. 10, 1996

[30] Foreign Application Priority Data

Jun. 9, 1995 [GB] United Kingdom .................... 9511739

[51] Int. Cl.⁶ ....................................................... F16F 7/10
[52] U.S. Cl. ............................................. 188/378; 74/574
[58] Field of Search ..................................... 188/290, 293, 188/378, 322.5, 379; 267/273, 279, 281, 284, 154; 74/574, 573 F

[56] References Cited

U.S. PATENT DOCUMENTS

| | | | |
|---|---|---|---|
| 3,603,172 | 9/1971 | Hall | 188/379 X |
| 4,660,436 | 4/1987 | Davoust et al. | 188/378 X |
| 4,872,369 | 10/1989 | Critton et al. | 188/379 X |
| 5,058,453 | 10/1991 | Graham et al. | 74/574 |

FOREIGN PATENT DOCUMENTS 290974  8/1953  Switzerland ............................. 74/574

*Primary Examiner*—Robert J. Oberleitner
*Assistant Examiner*—Pamela J. Lipka
*Attorney, Agent, or Firm*—Dykema Gossett PLLC

[57] ABSTRACT

A torsional vibration damper has a rotational axis and an annular housing having inner and outer members. The housing has an annular channel in which an inertia member is received. The channel has axially extending walls and is closed by an annular cover plate to retain the inertia member The inner edge of the cover plate is received in a rabbet in the inner channel wall and is joined to the wall by means of a weld. The inner and outer members are connected by an annular weld at a central hub. The weld may extend between two radial extremes which are separated by a distance substantially greater than the thickness of weld. The damper is easier to manufacture and assemble and has greater structural integrity.

7 Claims, 3 Drawing Sheets

TORSIONAL VIBRATION DAMPER

TECHNICAL FIELD

The present invention relates to a torsional vibration damper and more particularly, but not exclusively, to such a damper used to limit the torsional vibrations in an internal combustion engine.

BACKGROUND ART

Torsional vibration dampers are used to limit the torsional vibrations that occur in a crankshaft of an internal combustion engine. Such dampers generally comprise an annular inertia member disposed within an annular chamber in a housing. A space between a wall of the chamber and the inertia member is filled with viscous damping fluid and the resistance to shear of the fluid between the chamber wall and the inertia member provides a damping effect.

One method of manufacturing this type of damper utilizes a sheet metal fabrication construction. The housing of such dampers generally comprises a two part construction. Typically each part comprises a central radial flange by which the damper is attached to the crankshaft and an outer region which is shaped to form the chamber. The parts are connected together such that the radial flanges are substantially coterminous and overlie one another and the outer regions combine to define the chamber.

One known torsional damper comprises a three component housing. The first two components are assembled to form a common radial flange as described above, and an outer region in the form of an annular channel. The annular inertia member is received in the channel and a third component in the form of a cover plate is fitted to cover the channel and seal the inertia member therein. The channel has an annular reservoir in which the viscous damping fluid is retained. Such an arrangement is simpler to manufacture than a two-component housing and is particularly advantageous in that the first component forming an outer wall of the channel can be made to a standard size whereas the second component can be made to various sizes to accommodate different sized annular inertia members for different damping criteria.

The cover plate is simply placed on the top edge of the walls of the channel and is fixed thereto at the junction between the walls and the cover plate by means of an electron beam weld or the like. When the damper is operational, the joints between the channel walls and the cover plate are subject to a relatively large amount of stress. In order to counteract this it has been known to increase the structural integrity by adding a large annular fillet weld in a corner of the channel at the flange where the first and second components meet. The use of a large fillet weld, however, can create distortion in the shape of the housing as a result of the significant heat produced in the welding process. Moreover, the fillet weld has to be machined to form the annular reservoir for the viscous damping fluid resulting in an increase in the manufacturing time and complexity.

It is an object of the present invention to obviate or mitigate the aforesaid disadvantages.

DISCLOSURE OF THE INVENTION

According to a first aspect of the present invention there is provided a torsional vibration damper having a rotational axis and comprising a housing having at least three parts, at least two of which define an annular channel in which an inertia member is received, wherein the channel has axially extending walls and is closed by a third part of the housing define an annular cover plate at least one edge of which is received in a rabbet in one of said walls and is joined to the wall by means of a weld.

According to a further aspect of the present invention there is provided a torsional vibration damper having a rotational axis and comprising an annular housing having two parts which define an annular channel in which an inertia member is received, wherein the housing parts are joined at a central radially extending flange by means of an elongated weld whose path extends between two radial extremities separated by a distance substantially greater than the weld thickness.

BEST MODE FOR CARRYING OUT THE INVENTION

Figure 1:
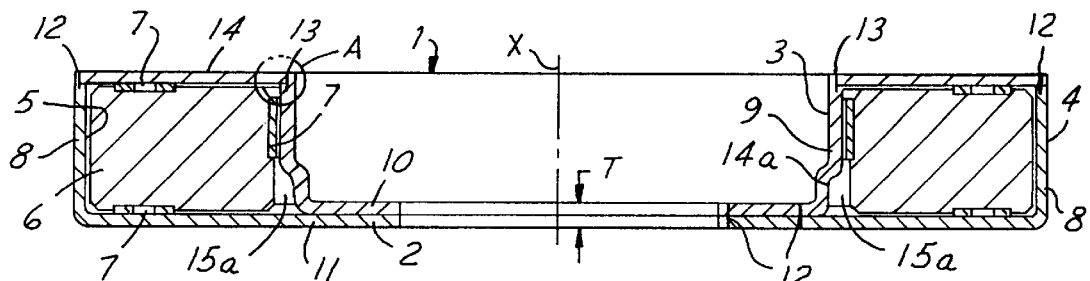
FIG. 1 is a cross sectional view of a first embodiment of the present invention.

Referring now to the drawings FIGS. 1 to 4 show torsional vibration dampers embodying the present invention. Each damper has a central rotational axis X and comprises a housing assembly (indicated generally by reference numeral 1) having a central radial flange 2 by which the damper is attached to a crankshaft (also not shown) of an internal combustion engine (not shown). In each of the embodiments of FIGS. 1 to 4 the same reference numerals are used to designate features which are common to all embodiments.

The housing is constructed from sheet metal and comprises three principal components: inner and outer members 3, 4 and cover plate 14. When assembled, the members 3, 4 form the central flange 2 and peripheral annular channel 5 in which an annular inertia member 6 is rotatably housed. The annular inertia member 6 is rectangular in cross section and has associated bearings 7 for radial and axial positioning. The annular channel 5 is defined between two concentric outer and inner axially extending walls 8, 9 and is closed by an annular cover plate 14 sealingly welded thereto in order to retain the inertia member 6 and viscous damping fluid present in the space between inertia member 6 and the walls of the enclosed channel 5.

Figure 5:
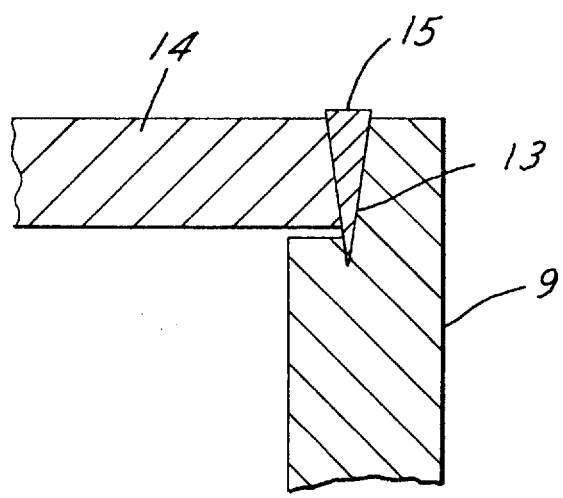
FIG. 5 is an enlarged a fragmentary sectional view of joint between a cover plate and a channel wall in circle A of FIG. 1.

In the embodiment shown in FIG. 1, the outer member 4 of the housing 1 is circular with an upstanding peripheral wall forming the outer axially extending channel wall 8. The inner member is similarly shaped with an upstanding wall forming the outer axially extending channel wall 9. Base walls 10, 11 of the inner and outer members 3, 4 are fixed together by annular welds 12 to form the flange 2. The free end of the inner wall 9 has an external rabbet or shoulder 13 within which the inner edge of the cover plate 14 is received (see FIG. 5). The cover plate 14 is placed over the channel 5 so that its outer edge sits on the end of the outer channel wall 8 and its inner edge is seated in the rabbet 13 of the inner channel wall 9 and is fixed there by means of an annular electron beam, laser or similar non-filler type welds 15.

Towards the flange 2 of the damper the inner channel wall 9 is inwardly stepped so as to form a groove 14a in a lower portion of the channel. The region between the groove 14a and the annular inertial member 6 acts as a reservoir 15a for the viscous damping fluid.

Figure 2:
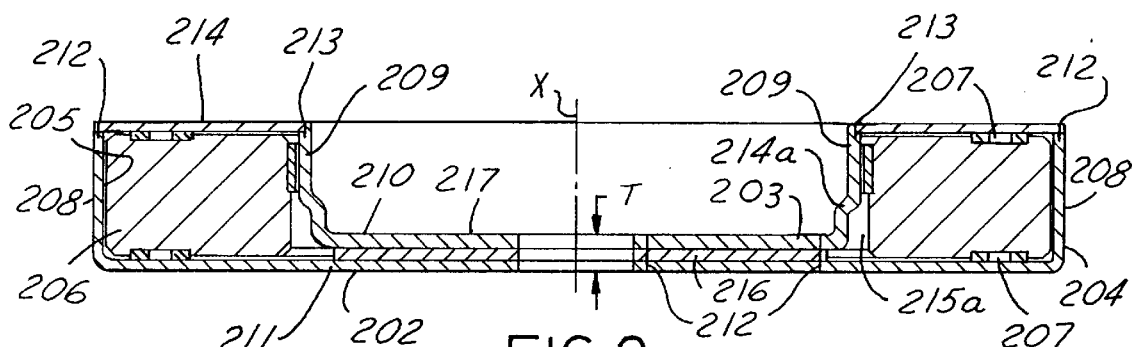
FIG. 2 is a cross sectional view of a second embodiment of the present invention.

The damper shown in FIG. 2 differs from that described in relation to FIG. 1 in that there is provided a circular flange strengthening plate 216 between the inner and outer housing members 203, 204. The welds 212 joining the inner and outer members 203, 204 at the flange 202 also fix the strengthening plate 216 in place. The other reference numerals used in FIG. 2 correspond to the reference numerals of FIG. 1 plus 200. For example, reference number 205 is associated with the annular channel of the embodiment of FIG. 2, reference number 210 is associated with the base wall, and so on.

Figure 3:
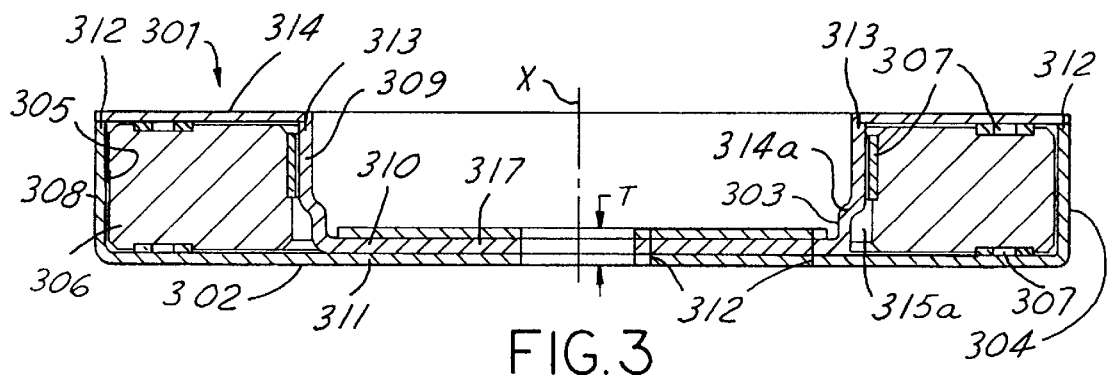
FIG. 3 is a cross sectional view of a third embodiment of the present invention.

In FIG. 3 a similar strengthening plate 317 is shown but is fixed at the flange 302 above the inner member 303. In an alternative embodiment (not shown) strengthening plates may be fixed below the outer member 304 at the flange 302. Reference numerals not specifically mentioned here which appear in FIG. 3 correspond to the reference numerals of FIG. 2 plus 100. For instance, reference numeral 305 is associated with the annular channel of the embodiment of FIG. 3, reference numeral 310 is associated with the base wall, and so on.

Figure 4:
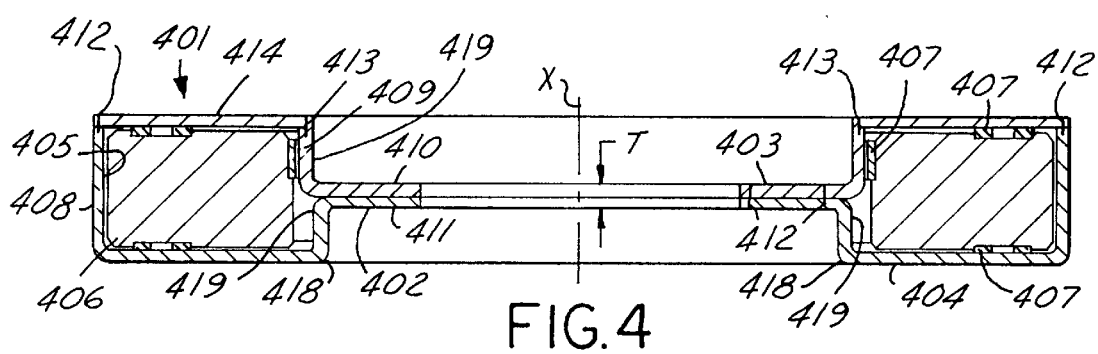
FIG. 4 is a cross sectional view of a fourth embodiment of the present invention.

FIG. 4 shows a damper in which the flange 402 is axially offset in relation to those shown in FIGS. 1 to 3. The offset is provided by the base wall 411 of the outer member 404 having an annular axial step 418. An inner channel wall 419 is formed partly from the upstanding wall 409 of the inner member 403 and partly from the axial step 418 in the base wall 411 of the outer member 404. An inner channel wall 419 is formed partly from the upstanding wall 409 of the inner member 403 and partly from the axial step 418 in the base wall 411 of the outer member 404. The flange portion of the inner member 403 is greater in diameter than that of the outer member 404 so that when the housing 401 is assembled a viscous damping fluid reservoir 419 is provided in the lower portion of the channel by virtue of the fact that there is a greater clearance between the step 418 and the inertia member 406 than that between the upstanding wall 409 of the inner member 403 and the inertia member 406. Reference numerals not specifically mentioned here which appear in FIG. 4 correspond to the reference numerals of FIG. 3 plus 100. For instance, reference numeral 405 is associated with the annular channel of the embodiment of FIG. 4, reference numeral 410 is associated with the base wall, and so on.

Stiffening plates such as those described in relation to FIGS. 2 and 3 may be used with this embodiment.

In each of the four embodiments described it will be appreciated that the housing has a separate cover plate 14, 214, 313, and 414 which is used to enclose the channel. In use, the joints between the cover plate 14, 214, 313, and 414 and the channel walls 8, 208, 308, and 408 9, 209, 309, and 409 or 419 are subject to stress It has been established that the joint between the cover plate 14, 214, 313, and 414 and inner channel wall 9 bears a significant proportion of the stress. The rabbet joint 13, 213, 313, and 413 provides greater sealing area, strength and load-bearing characteristics than other joints and a large part of the stress is borne by the channel wall 9 or 19 in the vicinity of the rabbet 13, 213, 313, and 413 rather than in the relatively weak weld.

The use of an electron beam, laser or other non-filler weld reduces the heat distortion that occurs in other welding techniques. Thus costly machining operations are not required and the design of the components of the damper can be made to precise tolerances.

Figure 6:
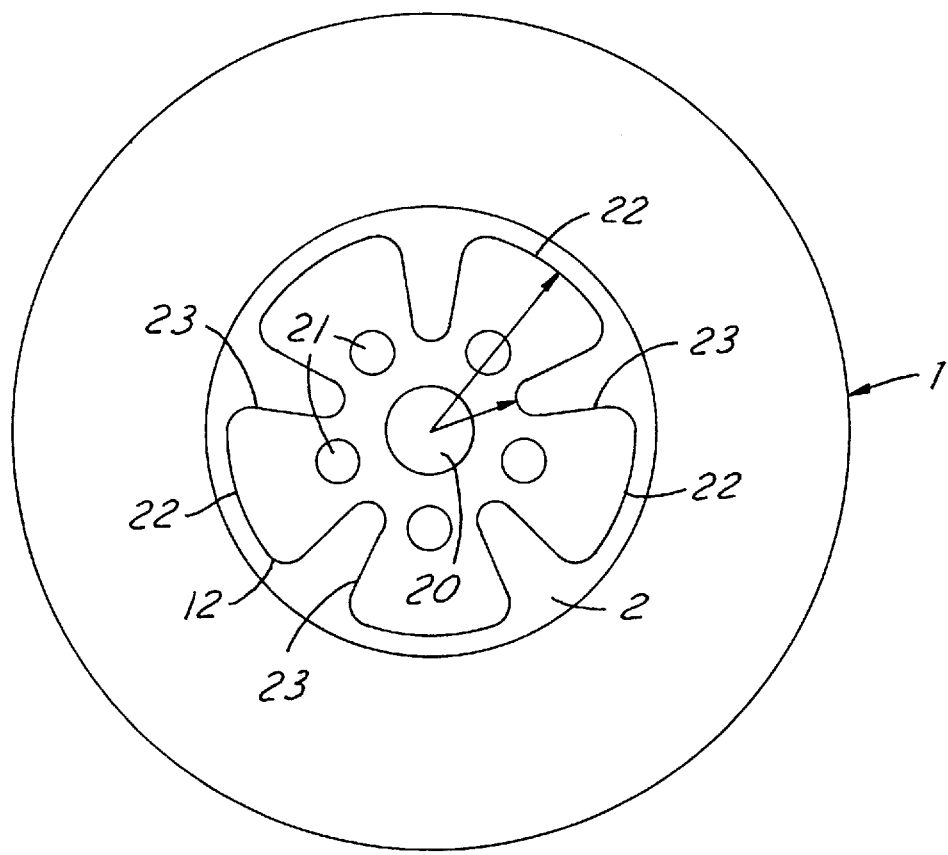
FIGS. 6 to 8 are schematic illustrations showing alternative welding configurations according to the invention.
Figure 7:
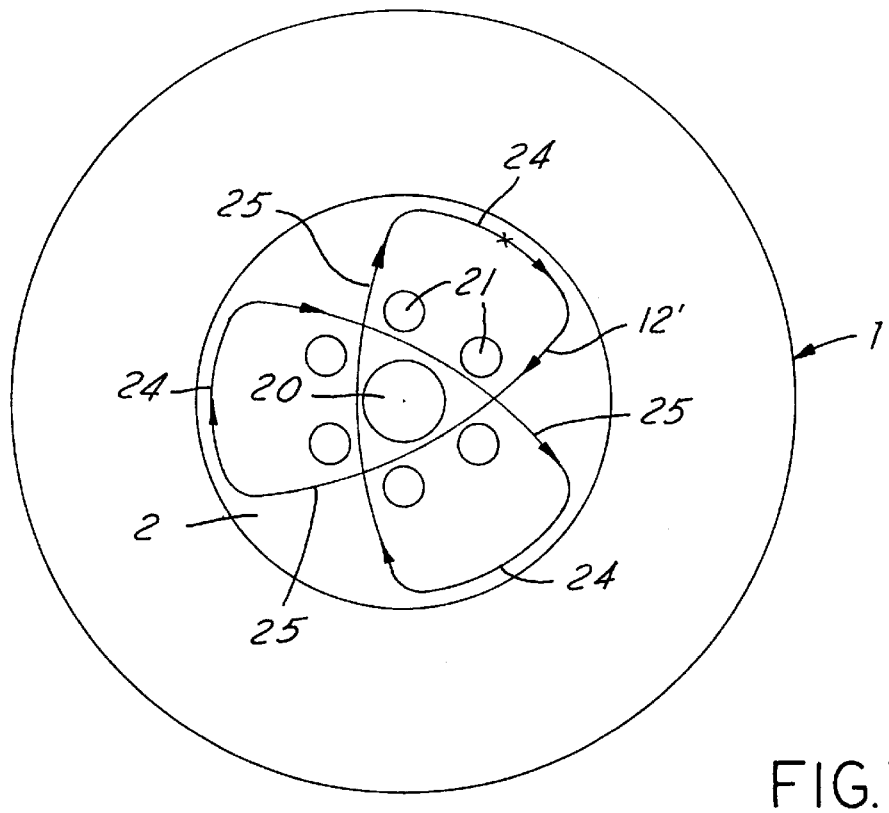
Figure 8:
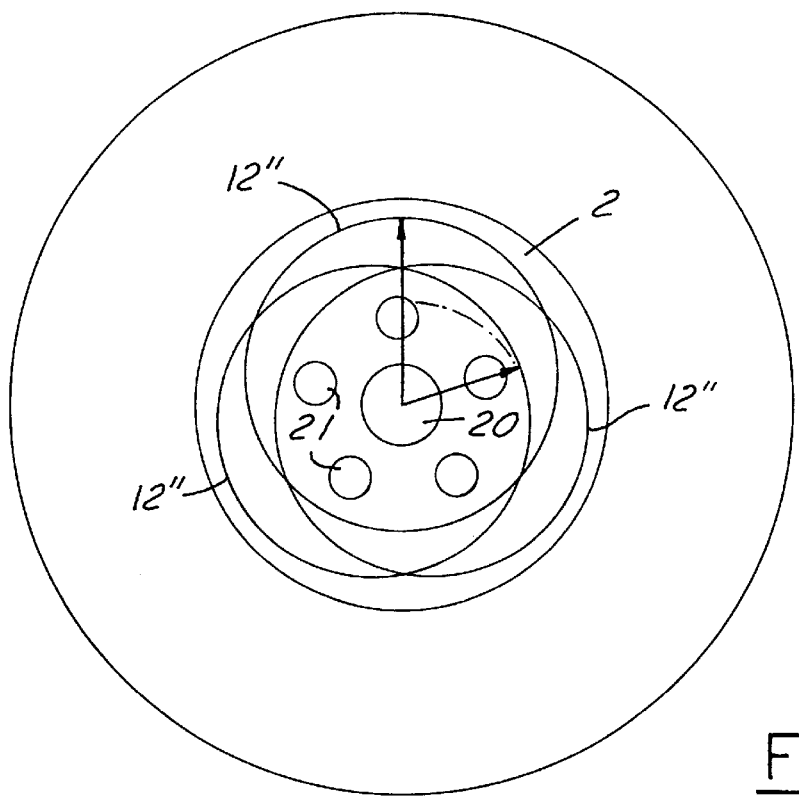

FIGS. 6 to 8 show welds 12 that may be used to join the inner and outer housing members 3, 4 at the flange 2. In addition to providing strength in the damper structure, the weld 12 acts to seal the members hermetically to prevent egress of the damper fluid. As shown in FIGS. 1, 2, 3 and 4, welds 12, 212, 312, and 412 through the base walls have a thickness "T" approximately equal to the cumulative thickness of base walls 10 and 11, 210 and 211, 310 and 311, and 410 and 411 respectively.

These figures show schematically the damper of FIGS. 1 to 4 in a plan view. A central location bore 20 through which the crankshaft (not shown) may pass is circumscribed by five smaller fixing bores 21 by which the damper is attached to the crankshaft.

The weld 12 shown in FIG. 6 passes between an imaginary outer circle at the edge of the flange 2 and an imaginary inner circle passing through the centers of the fixing bores 21. The weld 12 is continuous and comprises five equiangularly spaced arcs 22 at the edge of the flange 2, adjacent arcs being joined by radially inward U-shaped sweeps 23 as is clear from FIGS. 5, 7 and 8, the radial extent of weld 12 is much greater than the corresponding weld thickness "T".

FIG. 7 shows a continuous weld 12' in the form of three arcs 24 at the edge of the flange 2 being joined by arcuate sweeps 25 passing between the fixing bores 21 and interconnecting diametrically opposite points on the edge of the flange 2.

FIG. 8 shows three separate circles 12" of offset centers. The welding of these circles may be effected sequentially or simultaneously.

Each of the welds 12, 12', 12" shown in FIGS. 6 to 8 provide additional strength in the structure of the housing 1 by virtue of their progression in a radial direction as well as in a circumferential direction.

It will be appreciated that numerous modifications to the designs described above may be made without departing from the scope of the inventions as defined in the appended claims. For example, a rabbet joint may be used on the outer channel wall instead of or in addition to that on the inner channel wall.

Furthermore, the rabbet joint may be used in conjunction with a flange weld of any suitable pattern. With regard to FIGS. 6 to 8 it will be understood that different geometrical patterns may be used provided they extend between two radial extremities. It will also be appreciated that the above described vibration damper may be used in other applications where torsional vibration of the rotating component is required, e.g. impellers or rotors.

Having thus described the invention, what is claimed as novel and desired to be secured by Letters Patent of The United States of America is:

We claim:

1. A torsional vibration damper having a rotational axis and comprising a housing having at least three parts, at least two of which define an annular channel in which an inertia member is received, wherein the channel has axially extending walls and is closed by a third part of the housing defining an annular cover plate with at least one edge of the cover plate being received in a rabbet in one of said walls and the cover plate being joined to the one of said walls by means of a weld, wherein the first and second parts of the housing have separate overlapping radially inwardly extending base walls connected together to define a central radial flange and wherein in the first and second parts are connected at the flange by a weld whose path extends between two radial extremities separated by a distance substantially greater than a weld thickness.

2. A torsional vibration damper having a rotational axis and comprising a housing having two parts defining an annular channel in which an inertia member is received, wherein the housing parts are joined at a central flange by means of a weld whose path extends between two radial extremities separated by a distance substantially greater than the weld thickness.

3. A torsional vibration damper according to claim 2, wherein the weld is continuous.

4. A torsional vibration damper according to claim 3, wherein the weld path comprises a plurality of arcs at an outer periphery of the flange, adjacent arcs being joined by a radially inward path.

5. A torsional vibration damper according to claim 4, wherein the radially inward path comprises an arcuate path joining diametrically opposite points on adjacent arcs.

6. A torsional vibration damper according to claim 2, wherein the weld comprises a plurality of separate paths.

7. A torsional vibration damper according to claim 6 wherein the separate paths are in the form of centrally offset circles.

* * * * *